May 26, 1959     V. S. GOLEMON     2,887,986
VACUUM MILKING MACHINES

Filed Jan. 19, 1956     2 Sheets-Sheet 1

INVENTOR
VALIA S. GOLEMON

BY *Semmes & Semmes*

ATTORNEYS

May 26, 1959  V. S. GOLEMON  2,887,986
VACUUM MILKING MACHINES
Filed Jan. 19, 1956  2 Sheets-Sheet 2

INVENTOR
VALIA S. GOLEMON

BY *Semmes & Semmes*

ATTORNEYS

United States Patent Office 2,887,986
Patented May 26, 1959

2,887,986

VACUUM MILKING MACHINES

Valia S. Golemon, Burbank, Calif.

Application January 19, 1956, Serial No. 560,127

2 Claims. (Cl. 119—14.08)

The present invention relates to the so-called automatic or vacuum milking machines and more particularly to a modified control mechanism in combination therewith by means of which the milking operation may be initiated and arrested after completion with maximum efficiency.

One of the objects of my invention is to provide a semi-automatic regulator for the milking vacuum present in the apparatus.

A second object of the invention is to provide a vacuum control mechanism which is positive in its action, simple in its construction and readily manipulable.

Other objects and advantages of my invention will be readily apparent from the following detailed description of a preferred embodiment thereof when taken in conjunction with the accompanying drawings wherein.

Figure 1:
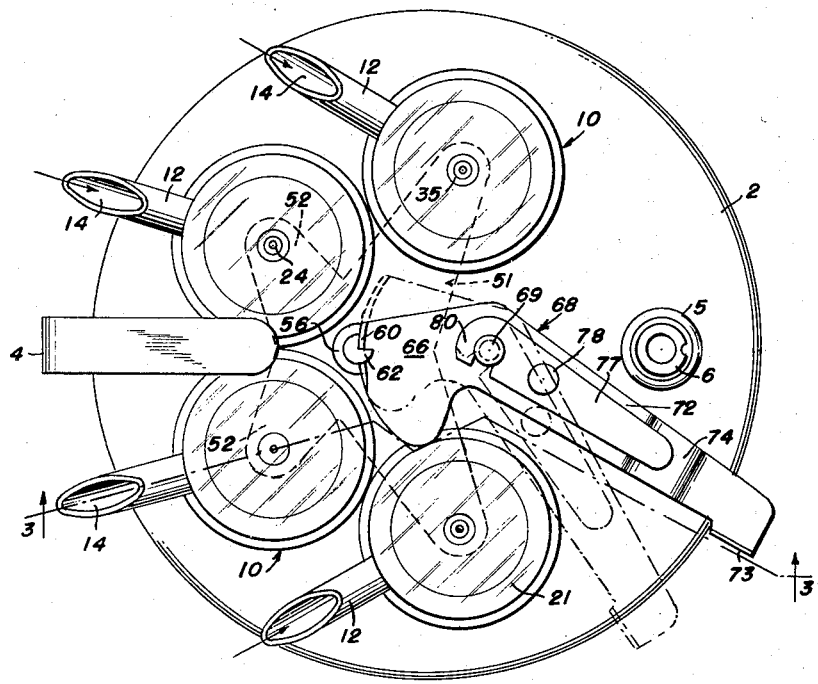
Figure 1 is a plan view of a milking machine cover assembly embodying the principles of the invention.
Figure 2:
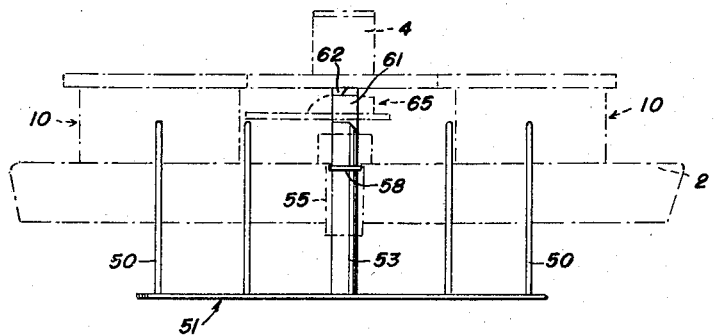
Figure 2 is an enlarged elevation view of the valve control plate employed in the apparatus.

Referring to the drawings, an automatic milking machine generally includes a reservoir or tank 1 in which collected milk is temporarily retained or through which milk may flow, said tank having a removable cover 2 in engagement therewith, a peripheral gasket 3 of rubber or other comparable material serving to seal the cover in place when the tank is evacuated of air during the milking operation. Clearance between cover flange and tank is sufficient to permit facile removal and placement of the cover. A handle 4 curved inwardly upon itself and joined by welding or other means to the cover 2 adjacent an edge thereof to simplify manipulation of the apparatus. The cover 2 is also provided with a vertically projecting nipple or adapter 5 to which a vacuum line (not shown) may be coupled. If desired, in accordance with existing practice, the pulsating mechanism operating the individual teat cups may be mounted upon the nipple 5.

Four cylindrical casings 10 of identical construction are mounted to cover 2 by convential welding or other suitable means, so as to project above and below cover 2. Each of the casings 10 has formed integrally in its upper, exposed portion a short tubular nipple 12 disposed at a slight upwardly inclined angle from the horizontal plane of cover 2 for engagement with a milk-conducting flexible hose (not shown) extending to a companion teat cup as is conventional in the art. The leading edge 14 of the nipple 12 is substantially parallel to the horizontal plane of the cover 2 to permit closure thereof, the flexible hose crimping over the leading edge 14 prior to connection to the cow's udder for the milking operation or during any time that lever 72 may be at a counter-clockwise rotated position as shown in solid lines in Figure 1 and when the teat cups are disconnected from the cows udder or udders.

Each cylindrical casing 10 constitutes an element 20 cup-shape fitted with a cover 21 of plastic or other suitable material of a size sufficient that its periphery projects beyond the edges of the casing 10. A dependent lip 22 spaced inwardly from the edge of cover 21 provides a support for an annular gasket 23 of rubber or other suitable material, substantially of L-shape in cross-section which serves to seal the cover 21 in position and prevents the leakage of air or fluid. A small bleeder orifice 24 is provided in the center of the cover 21.

A tubular post 26, open at both ends, extends upwardly from the center of the bottom of each element 20 and is integrally united therewith. The post 26 forms both a conduit for milk passing from the teat cup into the receiver 1 and a guide for a cylindrical float 30. Sufficient clearance is provided between the post 26 and an inner core sleeve 31 of the float to permit its free vertical movement along said post.

A rib bail 32 projects upwardly from the float 30 and is integrally attached at its ends to diametrically opposed points on the upper edge of said float 30. The bail 32 has a centrally located opening 34 in which is secured by frictional engagement a cap valve 35 of rubber or other similar material, its shank end 36 carrying a detent annular flange 37. The valve per se faces inwardly and downwardly toward the float 30. Detent flange 37 of the shank 36 of valve 35 permits a limited amount of vertical movement of said valve relative to the float 30. Thus when the float is lowered within the casing element 20, the valve becomes effective to close off the passage through post 26. The configuration of the bail 32 is such that the upward movement of the float 30 brings the shank end 36 of valve 35 in contact with bleeder orifice 24 to restrict as much as possible the flow of air until the float begins to drop as the milk flow ceases.

Figure 3:
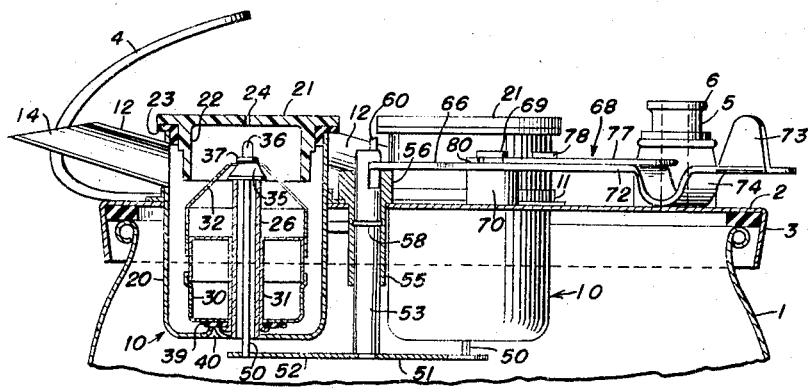
Figure 3 is a vertical sectional view, partially in elevation, taken substantially along the line 3—3 of Figure 1.
Figure 4:
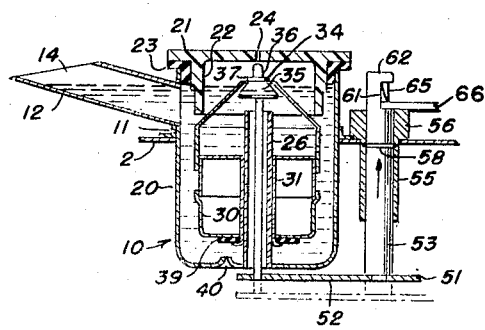
Figure 4 is a detailed sectional view of one of the valve chambers of the apparatus.

The lower end of the inner core sleeve 31 of the float 30 projects below the float and is flanged sufficiently to retain a flat annular gasket 39 of rubber or other similar material against the bottom surface of said float. This gasket 39 serves, when the float is in its lowered position, to seal a rimmed drain opening 40 provided in the bottom of the element 20 adjacent the post 26. See Figure 3.

Mechanical actuation of the valves 35, float element 30 and annular valve 39 to initiate flow of milk through the apparatus is obtained by means of lift rods 50 projecting vertically and centrally through the posts 26. Rods 50 are secured to and carried by a plate 51 having radial arms 52 by means of which the rods affixed thereto are brought into central alignment with posts 26. A central control rod 53 extends upwardly from the plate 51 to which it is secured as by conventional welding or other means. Rod 53 is in spaced parallel relation to the lift rods 50 and it projects through a sleeve 55 dependent from the cover 2 of the apparatus. Said sleeve has a collar 56 secured to the upper surface of the cover 2. The outer diameter of the rod 53 is slightly less than the inner diameter of the sleeve 55 to permit facile vertical reciprocation of all rods and their supporting plate while thus preventing angular binding displacement thereof. An O-ring seal 58 is disposed upon the rod 53 intermediate its ends, a suitable seating groove being provided in the rod for this purpose. The seal 58 prevents air or fluid passage through the sleeve 55.

Vertical movement of the rod 53 is effected by the lateral passage of a vertical camming surface 60 across a tenon 61 cut in the side of the rod 53 adjacent the upper end thereof and underneath lug portion 62 remaining on the end of said rod. The camming surface 60 is formed upon an arcuate flange 65 projecting upwardly from an auxiliary lobed arm 66 of a lever 68. Lever 68 is pivotally mounted upon a stud 69 extending from a boss 70 secured to the cover 2 and in spaced relation to the collar 56. The lever 68 has its main arm 72 extending outwardly toward the edge of the cover 2 and terminating in an upstanding finger grip 73 for ease of movement thereof. A dependent saddle 74 substantially of U-shape is formed in arm 72 adjacent the outer, free end thereof for sliding engagement with the upper surface of the cover 2 in order that undue vertical displacement of the lever 68 may be avoided. A detent bar 77 is pivotally secured to the arm 72 by means of a pin 78 positioned in spaced relation to the stud 69, said bar 77 carrying on its inner end a hook 80 for locking engagement with a seating groove provided in said stud.

Horizontal movement of the lever 68 about the vertical axis of the stud 69 is limited by contact of arms 66 and 72 with the adjacent casing 10. Vertical movement of the rod 53 is limited by the height of the camming flange 65 and the arm 66 upon which the lug 62 rests when in lowered position.

For operation, the apparatus is assembled and a flexible conduit (not shown) attached to the companion nipples 12 of the valve casings 10. Receiver 1 is placed under vacuum and pulsation of the teat cups started. The lever arm 72 is rotated counter-clockwise to assume the position shown in solid lines of Figure 1. In this position rod 53, plate 51 and lift rods 50 are raised, forcing the latter against cap valve 35 to move said valves and floats 30 together with annular valve 39 upwardly, thereby opening the main milk conduits 26 within the casings 10. Vacuum is thus applied through the flexible conduits to the teat cups, after which the teat cups are attached to the cows udders and the flow of milk is then initiated with the assistance of the teat cup pulsations. The milk as it enters the individual casings 10 provides buoyant support for the float elements therein, adequate to maintain the cap valves 35 above the ends of the posts 26 in the casings 10. With establishment of adequate milk flow, ascertainable through the transparent covers 21, the lever arm 72 may be rotated clockwise to the automatic teat cup shut-off position permitting the plate 51 and lift rods 50 to fall out of operative engagement with the several cap valves 35. See phantom lines of lever, Figure 1.

As the milk flow from each quarter ceases or reduces in volume sufficiently to allow the milk level in casing 10 to drop, then float elements 30 in casing 10 drop with said level. Milk now drains into receiver 1 through the drain opening 40 until valves 35 close conduits 26 and annular valves 39 close passages 40, shutting off the vacuum from casing 10. The vents 24 in caps 21 permit air to enter the casing 10 to restore atmospheric pressure therein and through the flexible conduit leading to the teat cups, whereupon the cups are released and drop off automatically.

It will be noted that the lips 22 of the caps 21 extend downwardly into the path of the milk as it emerges from the nipples 12 and thus deflect the same away from the valves 35 and around the floats 30.

The apparatus as herein described is readily assembled and dismantled for purposes of cleaning and/or sterilization after use. The major elements of the assembly are of such nearly impervious metals or comparable materials as are available. The several milk-conducting conduits are of such size that cleansing is not difficult.

It will be obvious that various modifications in the shape, size and arrangement of the several elements of my apparatus are possible without departing from the spirit of the invention or the scope of the appended claims.

I claim:

1. In milking apparatus for manually initiating the application of suction to teat cups, and including a plurality of independent casings adapted respectively to be connected to the teat cups; an upright tubular member in each of the casings, projecting upwardly within the respective casings, each tubular member having a lower end opening exteriorly of the casing to form a suction connection as well as a discharge opening for the casing space through the tubular member; a valve closure for each of the tubular ends for isolating the casing interior from the suction; a float surrounding each tubular member and carrying the corresponding closure for causing the upper end of the tubular member to be closed when the level of the milk in the casing recedes; means entering each tubular member from the bottom, for temporarily lifting all of the closures simultaneously; a vertically movable operating post for said means; a manually operable lever having a cam for engaging a surface carried by the post for lifting the post and thereby opening said closures; a vertical pivot forming means for the lever; and a common support for the casings and said pivot forming means; said lever being of resilient material and having a portion providing frictional contact with the common support so as releasably to maintain the lever in adjusted position.

2. In milking apparatus for manually initiating the application of suction to teat cups, and including a plurality of independent casing adapted respectively to be connected to the teat cups; an upright tubular member in each of the casings, projecting upwardly within the respective casings, each tubular member having a lower end opening exteriorly of the casing to form a suction connection as well as a discharge opening for the casing space through the tubular member; a valve closure for each of the tubular ends for isolating the casing interior from the suction; a float surrounding each tubular member and carrying the corresponding closure for causing the upper end of the tubular member to be closed when the level of the milk in the casing recedes; means entering each tubular member from the bottom, for temporarily lifting all of the closures simultaneously; a vertically movable operating post for said means; a manually operable lever having a cam for engaging a surface carried by the post for lifting the post and thereby opening said closures; a vertical pivot forming means for the lever; a common support for the casings and said pivot forming means; and a locking mechanism carried by the lever and optionally engaging or disengaging said pivot forming means to make it possible to remove the lever from said pivot forming means.

References Cited in the file of this patent

UNITED STATES PATENTS

| | | |
|---|---|---|
| 2,685,862 | Hill et al. | Aug. 10, 1954 |
| 2,718,208 | Tanner | Sept. 20, 1955 |
| 2,766,722 | Schultheis | Oct. 16, 1956 |
| 2,836,148 | Eades | May 27, 1958 |

FOREIGN PATENTS

| | | |
|---|---|---|
| 27,102 | Denmark | Jan. 5, 1921 |